US010572290B2

(12) United States Patent
Liu (10) Patent No.: US 10,572,290 B2
(45) Date of Patent: Feb. 25, 2020

(54) METHOD AND APPARATUS FOR ALLOCATING A PHYSICAL RESOURCE TO A VIRTUAL MACHINE

(71) Applicant: Huawei Technologies Co., Ltd., Shenzhen (CN)

(72) Inventor: Yong Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 15/694,448

(22) Filed: Sep. 1, 2017

(65) Prior Publication Data

US 2018/0018197 A1 Jan. 18, 2018

Related U.S. Application Data

(63) Continuation of application No. PCT/CN2015/073589, filed on Mar. 3, 2015.

(51) Int. Cl.
G06F 9/46 (2006.01)
G06F 9/455 (2018.01)
G06F 9/50 (2006.01)
H04L 29/08 (2006.01)

(52) U.S. Cl.
CPC ........ G06F 9/45558 (2013.01); G06F 9/5077 (2013.01); G06F 2009/4557 (2013.01); G06F 2009/45579 (2013.01); G06F 2009/45595 (2013.01); H04L 67/10 (2013.01)

(58) Field of Classification Search
None
See application file for complete search history.

(56) References Cited

U.S. PATENT DOCUMENTS 9,384,027 B2 * 7/2016 Cropper ................ G06F 9/5044
2008/0168457 A1 7/2008 Accapadi et al.
2010/0138828 A1 6/2010 Hanquez et al.
(Continued)

FOREIGN PATENT DOCUMENTS

CN 101859317 A 10/2010
CN 102571986 A 7/2012
(Continued)

OTHER PUBLICATIONS

Machine Translation and Abstract of Chinese Publication No. CN101859317, Oct. 13, 2010, 8 pages.
(Continued)

*Primary Examiner* — Bing Zhao
(74) *Attorney, Agent, or Firm* — Conley Rose, P.C.

(57) ABSTRACT

A virtual machine resource allocation method and apparatus applied to a virtual machine technology, and relate to the field of communications technologies and improve performance of a virtual machine, where the method includes acquiring a resource allocation parameter of a virtual machine, where the resource allocation parameter includes a scheduling parameter, and the scheduling parameter indicates that at least two of a physical processor resource, a physical memory, and a physical input/output (IO) device allocated to the virtual machine are located on a same processor node, and allocating a physical resource to the virtual machine according to the resource allocation parameter.

16 Claims, 3 Drawing Sheets

(56) References Cited

U.S. PATENT DOCUMENTS

2014/0258446 A1    9/2014  Bursell
2014/0331222 A1   11/2014  Zheng
2015/0040131 A1    2/2015  Shan et al.
2015/0120932 A1*   4/2015  Vissamsetti ............. H04L 47/70
                                                          709/226

FOREIGN PATENT DOCUMENTS

CN    102929687 A    2/2013
EP      2713270 A1   4/2014

OTHER PUBLICATIONS

Machine Translation and Abstract of Chinese Publication No. CN102571986, Jul. 11, 2012, 14 pages.
Machine Translation and Abstract of Chinese Publication No. CN102929687, Feb. 13, 2013, 15 pages.
Foreign Communication From a Counterpart Application, Chinese Application No. 201580000206.7, Chinese Office Action dated Nov. 27, 2017, 7 pages.
Foreign Communication From a Counterpart Application, PCT Application No. PCT/CN2015/073589, English Translation of International Search Report dated Dec. 18, 2015, 2 pages.
Foreign Communication From a Counterpart Application, PCT Application No. PCT/CN2015/073589, English Translation of Written Opinion dated Dec. 18, 2015, 6 pages.
Foreign Communication From a Counterpart Application, European Application No. 15883695.7, Extended European Search Report dated Jan. 5, 2018, 7 pages.

* cited by examiner

METHOD AND APPARATUS FOR ALLOCATING A PHYSICAL RESOURCE TO A VIRTUAL MACHINE

CROSS-REFERENCE TO RELATED APPLICATIONS

This application is a continuation of International Patent Application No. PCT/CN2015/073589 filed on Mar. 3, 2015, which is hereby incorporated by reference in its entirety.

TECHNICAL FIELD

The present disclosure relates to the communications field, and in particular, to a virtual machine resource allocation method and apparatus.

BACKGROUND

In a cloud environment, resource allocation (mapping) refers to that a requirement application for a virtual resource is made, and physical resource scheduling and allocation are performed, according to existing topology conditions of a physical resource and a resource pool, on the virtual resource needed by a virtual machine, and then the virtual resource is deployed according to a result of the resource scheduling. The virtual machine refers to a complete computer system that has a complete hardware system function and runs in a completely isolated environment by means of software simulation. The virtual resource may further include a virtual central processing unit (vCPU), a virtual memory (vMEM), a virtual input/output (vIO) device, and the like. In addition, the physical resource and the resource pool are generally provided in a form of a server or a server cluster. A server (cluster) has multiple processor nodes, where the processor node is a system that includes a physical central processing unit (CPU), and a physical memory and a physical input/output (IO) device that are directly connected to a pin of the physical CPU.

In other approaches, resources are generally allocated according to different virtual resource constraints. For example, a resource allocation method may be implemented in the following two manners.

Manner 1: A resource is allocated in a static random allocation manner. For example, during allocation of a resource to a virtual machine, a physical processor, a physical IO, and a physical memory that are not occupied are randomly selected and allocated to the virtual machine.

Manner 2: A resource is allocated in real time according to a load status of a physical processor. Further, the physical processor is dynamically allocated in real time to virtual processors of different virtual machines, according to a consumption status of each physical core (that is, a core in the physical processor, which is referred to as an independent computing unit in each physical processor) or hyperthread of the physical processor in order to achieve basically balanced consumption of all physical cores or hyperthreads of the physical processor. For example, if the physical processor has eight physical cores, one virtual processor of the virtual machines can be dynamically and periodically deployed on the eight physical cores, and one physical core is occupied in a period of time, and another physical core is occupied in a next period of time such that load of all the physical cores of the physical processor is basically balanced. However, the vMEM and the vIO are generally allocated in a random allocation manner.

In the foregoing two manners, a problem of a long data transmission delay exists between the virtual processor, the vMEM, and the vIO that are of the virtual machine, which increases consumption of the physical processor and reduces performance of the virtual machine.

SUMMARY

Embodiments of the present disclosure provide a virtual machine resource allocation method and apparatus, which can improve performance of a virtual machine.

To achieve the foregoing objective, the present disclosure uses the following technical solutions.

According to a first aspect of the present disclosure, a virtual machine resource allocation method is provided, including acquiring a resource allocation parameter of a virtual machine, where the resource allocation parameter includes a scheduling parameter, and the scheduling parameter is used to indicate that at least two of a physical processor resource, a physical memory, and a physical IO device that are allocated to the virtual machine are located on a same processor node, and allocating a physical resource to the virtual machine according to the resource allocation parameter.

In a first possible implementation manner of the first aspect, the scheduling parameter includes at least either one of a scheduling memory parameter and a scheduling IO device parameter, where the scheduling memory parameter is used to indicate that the physical processor resource allocated to the virtual machine and the physical memory allocated to the virtual machine are both located on the same processor node, and the scheduling IO device parameter is used to indicate that the physical processor resource allocated to the virtual machine and the physical IO device allocated to the virtual machine are both located on the same processor node.

With reference to the first possible implementation manner of the first aspect, in a second possible implementation manner of the first aspect, the scheduling IO device parameter includes at least one of a scheduling network adapter IO device parameter, a scheduling memory IO device parameter, and a scheduling acceleration IO device parameter, where the scheduling network adapter IO device parameter is used to indicate that the physical processor resource allocated to the virtual machine and a network adapter IO device allocated to the virtual machine are located on the same processor node, the scheduling memory IO device parameter is used to indicate that the physical processor resource allocated to the virtual machine and a memory IO device allocated to the virtual machine are located on the same processor node, and the scheduling acceleration IO device parameter is used to indicate that the physical processor resource allocated to the virtual machine and an acceleration IO device allocated to the virtual machine are located on the same processor node.

With reference to the first possible implementation manner of the first aspect or the second possible implementation manner of the first aspect, in a third possible implementation manner of the first aspect, the resource allocation parameter further includes a satisfaction degree parameter, and the satisfaction degree parameter is used to instruct to allocate the physical resource to the virtual machine according to all or some of parameters in the scheduling parameter, where if the satisfaction degree parameter instructs to allocate the physical resource according to all of the parameters in the scheduling parameter, when the scheduling parameter includes both the scheduling memory parameter and the scheduling IO device parameter, the physical processor resource, the physical memory, and the physical IO device that are allocated to the virtual machine are all located on the same processor node, and if the satisfaction degree parameter instructs to allocate the physical resource according to some of the parameters in the scheduling parameter, two of the physical processor resource, the physical memory, and the physical IO device that are allocated to the virtual machine are located on the same processor node.

With reference to the first aspect, the first possible implementation manner of the first aspect, the second possible implementation manner of the first aspect, or the third possible implementation manner of the first aspect, in a fourth possible implementation manner of the first aspect, the resource allocation parameter further includes a priority parameter, where the priority parameter is used to indicate a parameter that is in the scheduling parameter and has a highest priority or a lowest priority, and allocating a physical resource to the virtual machine according to the resource allocation parameter includes allocating the physical resource to the virtual machine according to the scheduling parameter and the priority parameter such that the physical resource allocated to the virtual machine satisfies the scheduling parameter that has the highest priority.

With reference to the first aspect or any one of the foregoing possible implementation manners of the first aspect, in a fifth possible implementation manner of the first aspect, the resource allocation parameter further includes a deployment parameter, where the deployment parameter includes at least one of an isolation parameter, a sharing parameter, a hyperthread enabling parameter, and a hyperthread allocation parameter, where the isolation parameter is used to indicate whether a same hyperthread on a same physical core is shared between the physical processor resource allocated to the virtual machine and a physical processor resource allocated to a virtual machine hypervisor. The sharing parameter is used to indicate whether the physical processor resource allocated to the virtual machine and a physical processor resource allocated to any one of other virtual machines share the same hyperthread on the same physical core. The hyperthread enabling parameter is used to indicate whether multiple hyperthreads on the same physical core are all enabled, and the hyperthread allocation parameter is used to indicate whether the multiple hyperthreads on the same physical core are allowed to be separately allocated to different virtual machines.

With reference to the first aspect or any one of the foregoing possible implementation manners of the first aspect, in a sixth possible implementation manner of the first aspect, before allocating a physical resource to the virtual machine according to the resource allocation parameter, the method further includes acquiring topology information of the processor node, and allocating a physical resource to the virtual machine according to the resource allocation parameter includes selecting the processor node and selecting the physical resource in the processor node, according to the topology information of the processor node and the resource allocation parameter of the virtual machine, and allocating the selected physical resource to the virtual machine.

With reference to the seventh possible implementation manner of the first aspect, in a seventh possible implementation manner of the first aspect, the topology information includes a quantity of processor nodes, core information of a physical processor in the processor node, information about a size of the physical memory that can be allocated in the processor node, and IO device information of the processor node, where the core information includes at least one type of a quantity of the physical cores, a quantity of the hyperthreads on the physical core, and frequency of the physical core, and the IO device information includes a quantity, bandwidth, and a type of network adapter IO devices that can be allocated, or a quantity, bandwidth, and a type of memory IO devices that can be allocated, or a quantity, bandwidth, and type of acceleration IO devices that can be allocated.

According to a second aspect, a virtual machine resource allocation apparatus is provided, including a first physical processor, a first physical memory, and a physical IO device, where the first physical processor is configured to acquire a resource allocation parameter of a virtual machine using the first physical IO device, where the resource allocation parameter includes a scheduling parameter, and the scheduling parameter is used to indicate that at least two of a second physical processor, a second physical memory, and a second physical IO device that are allocated to the virtual machine are located on a same processor node, and allocate a physical resource to the virtual machine according to the resource allocation parameter.

In a first possible implementation manner of the second aspect, the scheduling parameter includes at least either one of a scheduling memory parameter and a scheduling IO device parameter, where the scheduling memory parameter is used to indicate that the second physical processor allocated to the virtual machine and the second physical memory allocated to the virtual machine are both located on the same processor node, and the scheduling IO device parameter is used to indicate that the second physical processor allocated to the virtual machine and the second physical IO device allocated to the virtual machine are both located on the same processor node.

With reference to the first possible implementation manner of the second aspect, in a second possible implementation manner of the second aspect, scheduling IO device parameter includes at least one of a scheduling network adapter IO device parameter, a scheduling memory IO device parameter, and a scheduling acceleration IO device parameter, where the scheduling network adapter IO device parameter is used to indicate that the second physical processor allocated to the virtual machine and a network adapter IO device allocated to the virtual machine are located on the same processor node, the scheduling memory IO device parameter is used to indicate that the second physical processor allocated to the virtual machine and a memory IO device allocated to the virtual machine are located on the same processor node, and the scheduling acceleration IO device parameter is used to indicate that the second physical processor allocated to the virtual machine and an acceleration IO device allocated to the virtual machine are located on the same processor node.

With reference to the first possible implementation manner of the second aspect or the second possible implementation manner of the second aspect, in a third possible implementation manner of the second aspect, the resource allocation parameter further includes a satisfaction degree parameter, and the satisfaction degree parameter is used to instruct to allocate the physical resource to the virtual machine according to all or some of parameters in the scheduling parameter, and the first physical processor is further configured to allocate, if the satisfaction degree parameter instructs to allocate the physical resource according to all of the parameters in the scheduling parameter, when the scheduling parameter includes both the scheduling memory parameter and the scheduling IO device parameter, the second physical processor, the second physical memory, and the second physical IO device that are allocated to the virtual machine from the same processor node, and allocate, if the satisfaction degree parameter instructs to allocate the physical resource according to some of the parameters in the scheduling parameter, two of the second physical processor, the second physical memory, and the second physical IO device that are allocated to the virtual machine from the same processor node.

With reference to the second aspect or any one of the foregoing possible implementation manners of the second aspect, in a fourth possible implementation manner of the second aspect, the resource allocation parameter further includes a priority parameter, where the priority parameter is used to indicate a parameter that is in the scheduling parameter and has a highest priority or a lowest priority, and allocating a physical resource to the virtual machine according to the resource allocation parameter includes allocating the physical resource to the virtual machine according to the scheduling parameter and the priority parameter such that the physical resource allocated to the virtual machine satisfies the scheduling parameter that has the highest priority.

With reference to the second aspect or any one of the foregoing possible implementation manners of the second aspect, in a fifth possible implementation manner of the second aspect, the resource allocation parameter further includes a deployment parameter, where the deployment parameter includes at least one of an isolation parameter, a sharing parameter, a hyperthread enabling parameter, and a hyperthread allocation parameter, where the isolation parameter is used to indicate whether a same hyperthread on a same physical core is shared between the physical processor resource allocated to the virtual machine and a physical processor resource allocated to a virtual machine hypervisor. The sharing parameter is used to indicate whether the physical processor resource allocated to the virtual machine and a physical processor resource allocated to any one of other virtual machines share the same hyperthread on the same physical core. The hyperthread enabling parameter is used to indicate whether multiple hyperthreads on the same physical core are all enabled, and the hyperthread allocation parameter is used to indicate whether the multiple hyperthreads on the same physical core are allowed to be separately allocated to different virtual machines.

With reference to the second aspect or any one of the foregoing possible implementation manners of the second aspect, in a sixth possible implementation manner of the second aspect, the first physical processor is further configured to acquire topology information of the processor node, and store the topology information in the first physical memory, and allocating a physical resource to the virtual machine according to the resource allocation parameter includes selecting the processor node and selecting the physical resource in the processor node, according to the topology information of the processor node and the resource allocation parameter of the virtual machine, and allocating the selected physical resource to the virtual machine.

According to a virtual machine resource allocation method and apparatus provided in the present disclosure, the resource allocation method includes acquiring a resource allocation parameter of a virtual machine, where the resource allocation parameter includes a scheduling parameter, and the scheduling parameter is used to indicate that at least two of a physical processor resource, a physical memory, and a physical IO device that are allocated to the virtual machine are located on a same processor node, and allocating a physical resource to the virtual machine according to the resource allocation parameter. It can be learned that this manner enables at least two of the physical processor resource, the physical memory, and the physical IO device that are allocated to the virtual machine to be located on the same processor node, which reduces a data transmission delay between the virtual processor, the vMEM, and the vIO of the virtual machine, thereby reducing consumption of a physical processor and improving performance of the virtual machine.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

First, it should be noted that a server may include multiple processor nodes, and a processor node includes a physical processor, and a physical memory and a physical IO that are directly connected to a pin of the physical processor. For details, reference may be made to a Node 1, a Node 2, a Node 3, and a Node 4 that are in FIG. 1. A physical processor has multiple physical cores, and a physical core has multiple hyperthreads. Based on this, the following concepts are involved in the present disclosure, which are briefly described as follows with reference to FIG. 1.

Figure 1:
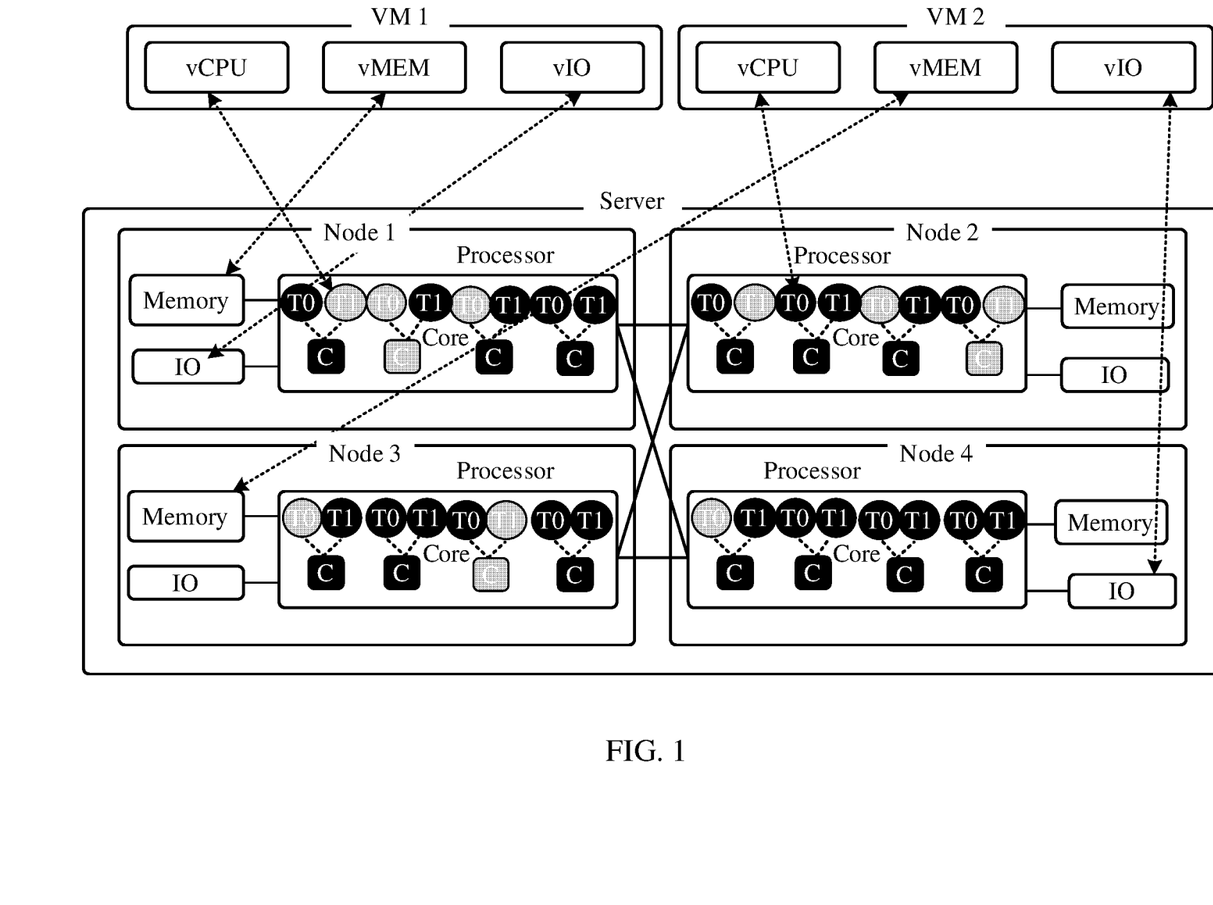
FIG. 1 is an exemplary schematic diagram of a resource allocation method.

Physical processor, denoted by "Processor" marked in the processor node, Node 1 shown in FIG. 1, physical core, that is, a core in a physical processor, which refers to an independent computing unit in each physical processor, denoted by a letter "C" marked in a processor shown in FIG. 1, physical hyperthreads, which refers to computing units that share a physical core in a time-division manner using multiple copies of status register information, denoted by a symbol "T0" and a symbol "T1" that are marked in a processor shown in FIG. 1, physical memory, that is, a memory in a physical processor, denoted by "Memory" marked on the Node 1 shown in FIG. 1, physical IO, that is, an IO device in a physical processor, denoted by "IO" marked in the Node 1 shown in FIG. 1, vMEM, that is, a memory in a virtual machine, which refers to a physical memory allocated to the virtual machine, vIO, that is, an IO device of a virtual machine, which refers to a physical IO device allocated to the virtual machine, and vCPU, that is, a virtual processor of a virtual machine, which refers to a physical processor allocated to the virtual machine, and may further be a physical core allocated to the virtual machine or a hyperthread allocated to the virtual machine.

Referring to FIG. 1, even though a vCPU, a vMEM, and a vIO that are of a virtual machine VM 1 mapped from a physical CPU, a physical memory, and a physical IO that are of a same processor node a vCPU, a vMEM, and a vIO that are of a virtual machine VM 2 are mapped from a physical CPU, a physical memory, and a physical IO that are of different processor nodes (i.e., Node 2, Node 3, and Node 4, respectively), and this manner of transmitting data across processor nodes leads to a long data transmission delay of the virtual machine VM 2, and increases consumption of the physical processor in the processor node.

Embodiment 1

Figure 2:
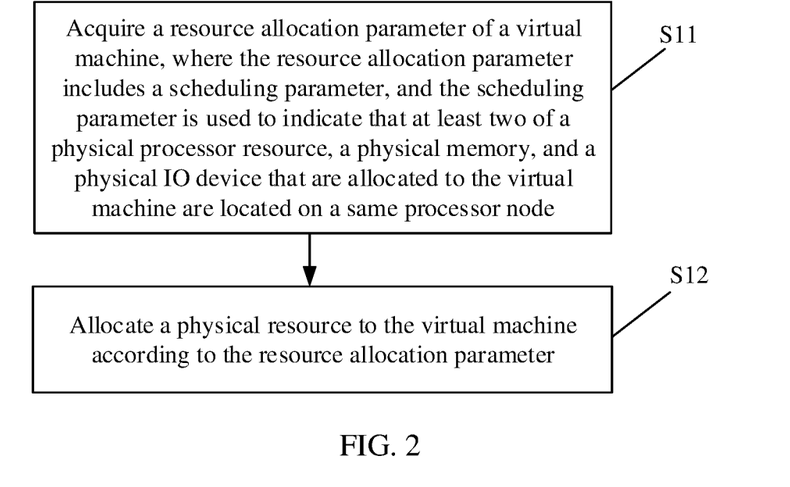
FIG. 2 is a schematic flowchart of a resource allocation method according to Embodiment 1 of the present disclosure.

Embodiment 1 of the present disclosure provides a virtual machine resource allocation method, where the method may be implemented in a server, a server cluster, or another carrier that is a form other than a server. As shown in FIG. 2, the method includes the following steps.

Step S11: Acquire a resource allocation parameter of a virtual machine, where the resource allocation parameter includes a scheduling parameter, and the scheduling parameter is used to indicate that at least two of a physical processor resource, a physical memory, and a physical IO device that are allocated to the virtual machine are located on a same processor node, where the physical processor resource may be an entire physical processor, may be a physical core in the physical processor, or may be a hyperthread on the physical core.

The resource allocation parameter in the other approaches does not include the foregoing scheduling parameter. However, in the embodiment of the present disclosure, because whether the physical processor resource, the physical memory, and the physical IO device that are allocated by the virtual machine are located on the same processor node affects application performance of a virtual machine, the scheduling parameter is added in the resource allocation parameter of a virtual resource.

In the embodiment of the present disclosure, the scheduling parameter includes at least either one of a scheduling memory parameter and a scheduling IO device parameter, where the scheduling memory parameter is used to indicate that the physical processor resource allocated to the virtual machine and the physical memory allocated to the virtual machine are both located on the same processor node, and the scheduling IO device parameter is used to indicate that the physical processor resource allocated to the virtual machine and the physical IO device allocated to the virtual machine are both located on the same processor node.

Further, the scheduling memory parameter is used to indicate that the physical processor resource allocated to the virtual machine and the physical memory allocated to the virtual machine are both located on the same processor node. Hence, the physical processor resource and the physical memory that are allocated to the same virtual machine do not need to transmit data across processor nodes. Likewise, the scheduling IO device parameter is used to indicate that the physical processor resource allocated to the virtual machine and the physical IO device allocated to the virtual machine are both located on the same processor node. Hence, the physical processor resource and the physical memory that are allocated to the same virtual machine do not need to transmit data across processor nodes.

For example, in a scenario in which a forwarding-type virtual machine is applied for in a network with a heavy traffic, the scheduling memory parameter and the scheduling IO device parameter are used to enable a processor, a memory, and an IO device that are allocated to a virtual machine to be located on the same processor node. In case of a same resource requirement, this allocation manner may enable the virtual machine that is allocated a resource to have better performance.

Further, in the embodiment of the present disclosure, the scheduling IO device parameter further includes at least one of a scheduling network adapter IO device parameter, a scheduling memory IO device parameter, and a scheduling acceleration IO device parameter, where the scheduling network adapter IO device parameter is used to indicate that the physical processor resource allocated to the virtual machine and a network adapter IO device allocated to the virtual machine are located on the same processor node, the scheduling memory IO device parameter is used to indicate that the physical processor resource allocated to the virtual machine and a memory IO device allocated to the virtual machine are located on the same processor node, and the scheduling acceleration IO device parameter is used to indicate that the physical processor resource allocated to the virtual machine and an acceleration IO device allocated to the virtual machine are located on the same processor node.

For example, in a case in which a virtual machine with accelerated encryption and decryption is applied for, the scheduling memory parameter and the scheduling IO device parameter are used to enable a processor, a memory, and an IO device that are allocated to the virtual machine are located on the same processor node. In case of a same resource requirement, this allocation manner may enable the virtual machine that is allocated a resource to have better performance.

Step S12: Allocate a physical resource to the virtual machine according to the resource allocation parameter.

Further, the physical resource is allocated to the virtual machine according to the resource allocation parameter added in the foregoing step S11 and an existing resource allocation parameter using a scheduling algorithm. For example, a physical resource that can be allocated to the virtual machine is selected from a particular server, and the physical resource further includes a physical processor resource, a physical memory, and a physical IO device. After the selection, a mapping relationship between the virtual resource and the physical resource that are of the virtual machine can be determined. Then, according to the mapping relationship, the physical resource is separately mapped to a virtual processor, a virtual memory, and a virtual IO that are of the virtual machine in order to allocate the physical resource to the virtual machine.

According to a virtual machine resource allocation method provided in the present disclosure, the resource allocation method includes acquiring a resource allocation parameter of a virtual machine, where the resource allocation parameter includes a scheduling parameter, and the scheduling parameter is used to indicate that at least two of a physical processor resource, a physical memory, and a physical IO device that are allocated to the virtual machine are located on a same processor node, and allocating a physical resource to the virtual machine according to the resource allocation parameter. It can be learned that this manner enables at least two of the physical processor resource, the physical memory, and the physical IO device that are allocated to the virtual machine to be located on the same processor node, which reduces a data transmission delay between the virtual processor, the vMEM, and the vIO of the virtual machine, thereby reducing consumption of a physical processor and improving performance of the virtual machine.

Optionally, in an implementation scenario of the foregoing embodiment, the resource allocation parameter in step S11 may further include a priority parameter, where the priority parameter is used to indicate a parameter that is in the scheduling parameter and has a highest priority or a lowest priority.

In this case, the foregoing step S12 of allocating a physical resource to the virtual machine according to the resource allocation parameter may further include allocating the physical resource to the virtual machine according to the scheduling parameter and the priority parameter such that the physical resource allocated to the virtual machine satisfies the scheduling parameter that has the highest priority.

Further, multiple parameters included in the scheduling parameter may be set to have different priorities, where if a parameter included in the scheduling parameter is set to have a highest priority, during allocation of the physical resource to the virtual machine, the physical resource is allocated at least according to the parameter that has the highest priority, and if a parameter included in the scheduling parameter is set to have a lowest priority, first the physical resource is allocated according to a parameter whose priority is higher than the lowest priority, and then the physical resource is allocated according to the parameter with the lowest priority.

For example, assume that the scheduling parameter includes the scheduling memory parameter, the scheduling network adapter IO device parameter, and the scheduling memory IO device parameter, and the scheduling memory parameter is set to have a highest priority, the scheduling network adapter IO device parameter is set to have a lowest priority, and the scheduling memory IO device parameter is set to have a priority that is higher than the priority of the scheduling network adapter IO device parameter and lower than the priority of the scheduling memory parameter. During allocation of the physical resource to the virtual machine, first, the physical resource is allocated according to the scheduling memory parameter, that is, when the physical resource is allocated, that the physical processor resource allocated to the virtual machine and the physical memory allocated to the virtual machine are both located on the same processor node needs to be implemented. Next, the physical resource is allocated according to the scheduling memory IO device parameter, that is, when the physical resource is allocated, that the physical processor resource allocated to the virtual machine and the memory IO device allocated to the virtual machine are located on the same processor node needs to be implemented. Finally, the physical resource is allocated according to the scheduling network adapter IO device parameter, that is, when the physical resource is allocated, that the physical processor resource allocated to the virtual machine and the network adapter IO device allocated to the virtual machine are located on the same processor node needs to be implemented.

In addition, optionally, in another implementation scenario of the foregoing embodiment, the resource allocation parameter in step S11 further includes a satisfaction degree parameter, and the satisfaction degree parameter is used to instruct to allocate the physical resource to the virtual machine according to all or some of parameters in the scheduling parameter, where if the satisfaction degree parameter instructs to allocate the physical resource according to all of the parameters in the scheduling parameter, when the scheduling parameter includes both the scheduling memory parameter and the scheduling IO device parameter, the physical processor resource, the physical memory, and the physical IO device that are allocated to the virtual machine are all located on the same processor node, and if the satisfaction degree parameter instructs to allocate the physical resource according to some of the parameters in the scheduling parameter, two of the physical processor resource, the physical memory, and the physical IO device that are allocated to the virtual machine are located on the same processor node.

Further, a set satisfaction degree parameter is, to some degree, a parameter that is used to forcibly perform resource allocation. For example, when the satisfaction degree parameter is set to instruct to allocate the physical resource according to all of the parameters included in the scheduling parameter, and the scheduling parameter includes both the scheduling memory parameter and the scheduling IO device parameter, the physical processor resource, the physical memory, and the physical IO device that are allocated to the virtual machine are forcibly made to be located on the same processor node. For another example, when the satisfaction degree parameter is set to instruct to allocate the physical resource according to some parameters included in the scheduling parameter, for example, the physical resource is allocated according to the scheduling network adapter IO device parameter, two of the physical processor resource allocated to the virtual machine and the network adapter IO device allocated to the virtual machine need be located on the same processor node.

Optionally, in another implementation scenario of the foregoing embodiment, the resource allocation parameter in step S11 further includes a deployment parameter, and the deployment parameter may include at least one of an isolation parameter, a sharing parameter, a hyperthread enabling parameter, and a hyperthread allocation parameter, where the isolation parameter is used to indicate whether a same hyperthread on a same physical core is shared between the physical processor resource allocated to the virtual machine and a physical processor resource allocated to a virtual machine hypervisor. The sharing parameter is used to indicate whether the physical processor resource allocated to the virtual machine and a physical processor resource allocated to any one of other virtual machines share the same hyperthread on the same physical core. The hyperthread enabling parameter is used to indicate whether multiple hyperthreads on the same physical core are all enabled, and the hyperthread allocation parameter is used to indicate whether the multiple hyperthreads on the same physical core are allowed to be separately allocated to different virtual machines.

Further, the foregoing isolation parameter, sharing parameter, hyperthread enabling parameter, and hyperthread allocation parameter may represent different meanings using different values.

For example, for the hyperthread enabling parameter, when a value of the hyperthread enabling parameter is a first preset value, for example, 0 or yes, it represents that multiple hyperthreads on a physical core of a same physical processor are all enabled, when the value of the hyperthread enabling parameter is a second preset value, for example, 1 or no, it represents that only one of the multiple hyperthreads on the physical core of the same physical processor is enabled. In a case in which only one of the multiple hyperthreads on the physical core of the same physical processor is enabled, consumption of the physical processor is relatively low, and therefore efficiency of the virtual machine is improved. In addition, the value of the hyperthread enabling parameter may be a third preset value, which represents that only a particular quantity of the multiple hyperthreads of the same physical core are enabled. In this way, in a case in which more than one hyperthread needs to be enabled, it is not necessary to enable all the hyperthreads. The quantity may be set by a person skilled in the art, which is not limited in the present disclosure.

In addition, for the isolation parameter, when the value is, for example, 0 or yes, it represents that the same hyperthread on the same physical core is not shared between the physical processor resource allocated to the virtual machine and the physical processor resource allocated to the hypervisor, when the value is, for example, 1 or no, it represents that the same hyperthread on the same physical core is shared between the physical processor resource allocated to the virtual machine and the physical processor resource allocated to the hypervisor. In a case in which the physical processor resource allocated to the virtual machine and the physical processor allocated to the hypervisor do not share the same hyperthread on the same physical core, a competition for the same hyperthread by the virtual machine and the hypervisor can be eliminated, thereby avoiding a switchover between the virtual machine and the hypervisor when using the same hyperthread, and improving efficiency of the virtual machine.

Likewise, for setting of the sharing parameter, reference may be made to the setting of the foregoing isolation parameter. In this way, in a case in which the physical processor resource allocated to the virtual machine and the physical processor allocated to any one of other virtual machines do not share the same hyperthread on the same physical core, a competition for the same hyperthread between the virtual machine and any one of other virtual machines can be eliminated, thereby avoiding a switchover between the virtual machine and any one of the other virtual machines when using the same hyperthread, and improving the efficiency of the virtual machine.

Similarly, for the hyperthread allocation parameter, different values may be used to represent whether the hyperthread of the same physical core allows to be separately allocated to different virtual machines. In a case in which the hyperthread of the same physical core does not allow to be separately allocated to different virtual machines, it represents that the hyperthread on the physical core is exclusively occupied by only one virtual machine, thereby avoiding a switchover between the virtual machine and another virtual machine, and improving efficiency of the virtual machine.

In addition, optionally, in a specific embodiment of the present disclosure, before the step S12 of allocating the physical resource to the virtual machine according to the resource allocation parameter, the embodiment may further include the following steps (not shown in FIG. 2).

Step 121: Acquire topology information of the processor node.

In this case, step S12 includes selecting the processor node and selecting the physical resource in the processor node, according to the topology information of the processor node and the resource allocation parameter of the virtual machine, and allocating the selected physical resource to the virtual machine.

Optionally, the topology information may include a quantity of processor nodes, core information of the physical processor in the processor node, information about a size of the physical memory that can be allocated in the processor node, and IO device information of the processor node, where the core information includes at least one type of the following information a quantity of the physical cores, a quantity of the hyperthreads on the physical core, and frequency of the physical core, and the IO device information includes a quantity, bandwidth, and a type of network adapter IO devices that can be allocated, or a quantity, bandwidth, and a type of memory IO devices that can be allocated, or a quantity, bandwidth, and type of acceleration IO devices that can be allocated.

It should be noted that the foregoing various information included in the topology information of the processor, the memory, and the IO device that are on the processor node may be selectively used by a person skilled in the art according to experience or a specific practical situation. It is not limited that all the foregoing information needs be used.

Embodiment 2

Figure 3:
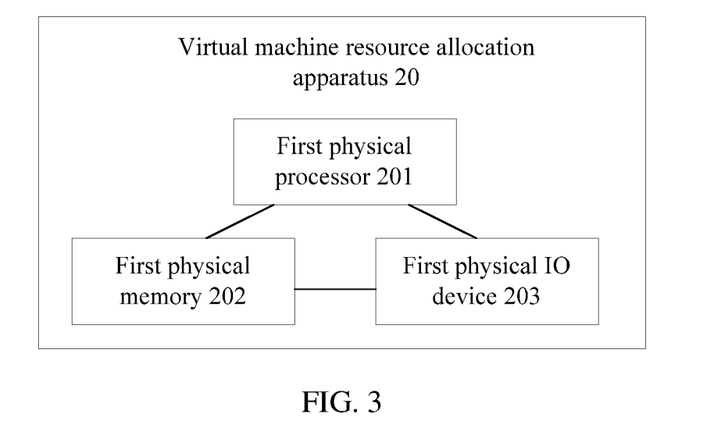
FIG. 3 is a schematic structural diagram of a virtual machine resource allocation apparatus according to Embodiment 2 of the present disclosure.

Embodiment 2 of the present disclosure provides a virtual machine resource allocation apparatus 20, where the apparatus 20 may be disposed in a server, a server cluster, or another carrier that is in a form other than a server. As shown in FIG. 3, the apparatus 20 includes a first physical processor 201, a first physical memory 202, and a first physical IO device 203, where the first physical processor 201 is configured to acquire a resource allocation parameter of a virtual machine using the first physical IO device 203, where the resource allocation parameter includes a scheduling parameter, and the scheduling parameter is used to indicate that at least two of a second physical processor, a second physical memory, and a second physical IO device that are allocated to the virtual machine are located on a same processor node, and allocate a physical resource to the virtual machine according to the resource allocation parameter.

According to the virtual machine resource allocation apparatus 20 provided in Embodiment 2 of the present disclosure, the apparatus 20 includes the first physical processor 201, and the first physical processor 201 acquires the resource allocation parameter of the virtual machine using a physical IO device, where the resource allocation parameter includes a scheduling parameter, and the scheduling parameter is used to indicate that at least two of the second physical processor, the second physical memory, and the second physical IO device that are allocated to the virtual machine are located on the same processor node, and the first physical processor 201 allocates the physical resource to the virtual machine according to the resource allocation parameter. It can be learned that this apparatus 20 enables at least two of the physical processor resource, the physical memory, and the physical IO device that are allocated to the virtual machine to be located on the same processor node, which reduces a data transmission delay between the virtual processor, the vMEM, and the vIO of the virtual machine, thereby reducing consumption of a physical processor and improving performance of the virtual machine.

It should be noted that the second physical processor, the second physical memory, and the second physical IO device may be disposed in the resource allocation apparatus 20, or maybe not disposed in the resource allocation apparatus 20, which is not limited herein.

Optionally, in a specific embodiment of the present disclosure, the scheduling parameter includes at least either one of a scheduling memory parameter and a scheduling IO device parameter, where the scheduling memory parameter is used to indicate that the second physical processor allocated to the virtual machine and the second physical memory allocated to the virtual machine are both located on the same processor node, and the scheduling IO device parameter is used to indicate that the second physical processor allocated to the virtual machine and the second physical IO device allocated to the virtual machine are both located on the same processor node.

Further, in a specific embodiment of the present disclosure, the scheduling IO device parameter includes at least one of a scheduling network adapter IO device parameter, a scheduling memory IO device parameter, and a scheduling acceleration IO device parameter, where the scheduling network adapter IO device parameter is used to indicate that the second physical processor allocated to the virtual machine and a network adapter IO device allocated to the virtual machine are located on the same processor node, the scheduling memory IO device parameter is used to indicate that the second physical processor allocated to the virtual machine and a memory IO device allocated to the virtual machine are located on the same processor node, and the scheduling acceleration IO device parameter is used to indicate that the second physical processor allocated to the virtual machine and an acceleration IO device allocated to the virtual machine are located on the same processor node.

Optionally, in a specific embodiment of the present disclosure, the resource allocation parameter further includes a satisfaction degree parameter, and the satisfaction degree parameter is used to instruct to allocate the physical resource to the virtual machine according to all or some of parameters in the scheduling parameters.

The first physical processor 201 is further configured to allocate, if the satisfaction degree parameter instructs to allocate the physical resource according to all of the parameters in the scheduling parameter, when the scheduling parameter includes both the scheduling memory parameter and the scheduling IO device parameter, the second physical processor, the second physical memory, and the second physical IO device that are allocated to the virtual machine from the same processor node, and allocate, if the satisfaction degree parameter instructs to allocate the physical resource according to some of the parameters in the scheduling parameter, two of the second physical processor, the second physical memory, and the second physical IO device that are allocated to the virtual machine from the same processor node.

Optionally, in a specific embodiment of the present disclosure, the resource allocation parameter further includes a priority parameter, where the priority parameter is used to indicate a parameter that is in the scheduling parameter and has a highest priority or a lowest priority, and the first physical processor 201 is further configured to allocate the physical resource to the virtual machine according to the scheduling parameter and the priority parameter such that the physical resource allocated to the virtual machine satisfies the scheduling parameter that has the highest priority.

Optionally, in a specific embodiment of the present disclosure, the resource allocation parameter further includes a deployment parameter, where the deployment parameter includes at least one of an isolation parameter, a sharing parameter, a hyperthread enabling parameter, and a hyperthread allocation parameter, where the isolation parameter is used to indicate whether a same hyperthread on a same physical core is shared between the physical processor resource allocated to the virtual machine and a physical processor resource allocated to a virtual machine hypervisor. The sharing parameter is used to indicate whether the physical processor resource allocated to the virtual machine and a physical processor resource allocated to any one of other virtual machines share the same hyperthread on the same physical core. The hyperthread enabling parameter is used to indicate whether multiple hyperthreads on the same physical core are all enabled, and the hyperthread allocation parameter is used to indicate whether the multiple hyperthreads on the same physical core are allowed to be separately allocated to different virtual machines.

Optionally, in a specific embodiment of the present disclosure, the first physical processor 201 is further configured to acquire topology information of the processor node, and store the topology information in the first physical memory 202, and select the processor node and select the physical resource in the processor node, according to the topology information of the processor node and the resource allocation parameter of the virtual machine, and allocate the selected physical resource to the virtual machine.

It should be noted that for a specific implementation manner of each structural part in the foregoing apparatus, reference may be made to the description in Embodiment 1, which is not repeatedly described herein.

Embodiment 3

Figure 4:
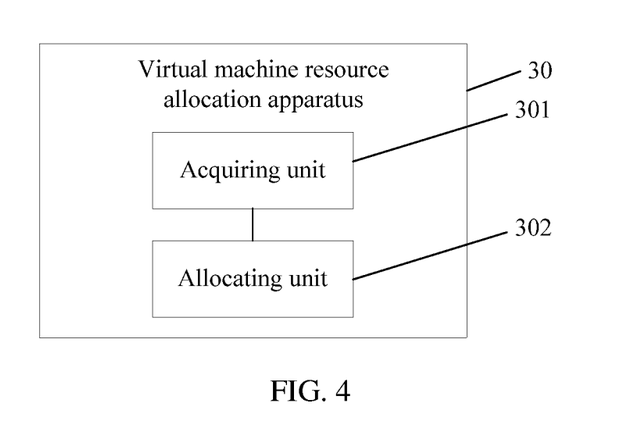
FIG. 4 is a schematic structural diagram of a virtual machine resource allocation apparatus according to Embodiment 3 of the present disclosure.

Embodiment 3 of the present disclosure provides a virtual machine resource allocation apparatus 30, where the apparatus 30 includes an acquiring unit 301 configured to acquire a resource allocation parameter of a virtual machine, where the resource allocation parameter includes a scheduling parameter, and the scheduling parameter is used to indicate that at least two of a physical processor resource, a physical memory, and a physical IO device that are allocated to the virtual machine are located on a same processor node, and an allocating unit 302 configured to allocate a physical resource to the virtual machine according to the resource allocation parameter.

According to the virtual machine resource allocation apparatus 30 provided in Embodiment 3 of the present disclosure, the acquiring unit 301 acquires the resource allocation parameter of the virtual machine, where the resource allocation parameter includes a scheduling parameter, and the scheduling parameter is used to indicate that at least two of a physical processor resource, a physical memory, and a physical IO device that are allocated to the virtual machine are located on the same processor node, and the allocating unit 302 allocates the physical resource to the virtual machine according to the resource allocation parameter. It can be learned that this apparatus 30 enables at least two of the physical processor resource, the physical memory, and the physical IO device that are allocated to the virtual machine to be located on the same processor node, which reduces a data transmission delay between the virtual processor, the vMEM, and the vIO of the virtual machine, thereby reducing consumption of a physical processor and improving performance of the virtual machine.

Optionally, the scheduling parameter includes at least either one of a scheduling memory parameter and a scheduling IO device parameter, where the scheduling memory parameter is used to indicate that the physical processor resource allocated to the virtual machine and the physical memory allocated to the virtual machine are both located on the same processor node, and the scheduling IO device parameter is used to indicate that the physical processor resource allocated to the virtual machine and the physical IO device allocated to the virtual machine are both located on the same processor node.

Further, the scheduling IO device parameter includes at least one of a scheduling network adapter IO device parameter, a scheduling memory IO device parameter, and a scheduling acceleration IO device parameter, where the scheduling network adapter IO device parameter is used to indicate that the physical processor resource allocated to the virtual machine and a network adapter IO device allocated to the virtual machine are located on the same processor node, the scheduling memory IO device parameter is used to indicate that the physical processor resource allocated to the virtual machine and a memory IO device allocated to the virtual machine are located on the same processor node, and the scheduling acceleration IO device parameter is used to indicate that the physical processor resource allocated to the virtual machine and an acceleration IO device allocated to the virtual machine are located on the same processor node.

Optionally, the resource allocation parameter further includes a satisfaction degree parameter, and the satisfaction degree parameter is used to instruct to allocate the physical resource to the virtual machine according to all or some of parameters in the scheduling parameter.

In this case, the allocating unit 302 is further configured to allocate, if the satisfaction degree parameter instructs to allocate the physical resource according to all of the parameters in the scheduling parameter, when the scheduling parameter includes both the scheduling memory parameter and the scheduling IO device parameter, the physical processor resource, the physical memory, and the physical IO device that are allocated to the virtual machine from the same processor node, and allocate, if the satisfaction degree parameter instructs to allocate the physical resource according to some of the parameters in the scheduling parameter, two of the physical processor resource, the physical memory, and the physical IO device that are allocated to the virtual machine from the same processor node.

Optionally, the resource allocation parameter further includes a priority parameter, where the priority parameter is used to indicate a parameter that is in the scheduling parameter and has a highest priority or a lowest priority.

In this case, the allocating unit 302 is further configured to allocate the physical resource to the virtual machine according to the scheduling parameter and the priority parameter such that the physical resource allocated to the virtual machine satisfies the scheduling parameter that has the highest priority.

In addition, optionally, the resource allocation parameter further includes a deployment parameter, where the deployment parameter includes at least one of an isolation parameter, a sharing parameter, a hyperthread enabling parameter, and a hyperthread allocation parameter, where the isolation parameter is used to indicate whether a same hyperthread on a same physical core is shared between the physical processor resource allocated to the virtual machine and a physical processor resource allocated to a virtual machine hypervisor. The sharing parameter is used to indicate whether the physical processor resource allocated to the virtual machine and a physical processor resource allocated to any one of other virtual machines share the same hyperthread on the same physical core. The hyperthread enabling parameter is used to indicate whether multiple hyperthreads on the same physical core are all enabled, and the hyperthread allocation parameter is used to indicate whether the multiple hyperthreads on the same physical core are allowed to be separately allocated to different virtual machines.

Optionally, the acquiring unit 301 is further configured to acquire topology information of the processor node.

In this case, the allocating unit 302 is further configured to select the processor node and select the physical resource in the processor node, according to the topology information of the processor node and the resource allocation parameter of the virtual machine, and allocate the selected physical resource to the virtual machine.

Optionally, the topology information includes a quantity of processor nodes, core information of a physical processor in the processor node, information about a size of the physical memory that can be allocated in the processor node, and IO device information of the processor node, where the core information includes at least one of a quantity of the physical cores, a quantity of the hyperthreads on the physical core, and frequency of the physical core, and the IO device information includes a quantity, bandwidth, and a type of network adapter IO devices that can be allocated, or a quantity, bandwidth, and a type of memory IO devices that can be allocated, or a quantity, bandwidth, and type of acceleration IO devices that can be allocated.

A person of ordinary skill in the art may understand that all or a part of the steps of the methods in the embodiments may be implemented by a program instructing relevant hardware. The program may be stored in a computer readable storage medium. The storage medium may include a read-only memory, a magnetic disc, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A virtual machine resource allocation method, comprising:
acquiring, by a server comprising a plurality of physical central processing units (CPUs), a resource allocation parameter of a virtual machine to which physical resources are to be allocated, wherein the resource allocation parameter comprises a scheduling parameter indicating that at least two of the physical resources to be allocated to the virtual machine are located on a same physical CPU, wherein the same physical CPU is selected from the plurality of physical CPUs, wherein the same physical CPU comprises a plurality of physical resources including at least a physical processor, a physical memory, and a physical input/output (IO) device, wherein the scheduling parameter comprises at least a scheduling memory parameter and a scheduling IO device parameter, wherein the scheduling memory parameter indicates that the physical processor and the physical memory are both located on the same physical CPU, and wherein the scheduling IO device parameter indicates that the physical processor and the physical IO device are both located on the same physical CPU;
allocating, by the server, the at least two physical resources to the virtual machine according to the resource allocation parameter such that two or more physical resources that are located on the same physical CPU are allocated to the virtual machine, wherein the resource allocation parameter further comprises a satisfaction degree parameter, wherein the satisfaction degree parameter instructs to allocate the physical resource to the virtual machine according to some of parameters in the scheduling parameter; and allocating two of the physical processor, the physical memory, and the physical IO device to the virtual machine from the same physical CPU when the satisfaction degree parameter instructs to allocate the physical resource according to some of the parameters in the scheduling parameter.

2. The method according to claim 1, wherein the scheduling IO device parameter comprises at least one of the following three parameters:
a scheduling network adapter IO device parameter indicating that the physical processor and a network adapter IO device are both located on the same physical CPU, wherein allocating the at least two physical resources comprises allocating the physical processor, the network adapter IO device, and at least one of the physical memory or the physical IO device to the virtual machine;
a scheduling memory IO device parameter indicating that the physical processor and a memory IO device are both located on the same physical CPU, wherein allocating the at least two physical resources comprises allocating the physical processor, the memory IO device, and at least one of the physical memory or the physical IO device to the virtual machine; or
a scheduling acceleration IO device parameter indicating that the physical processor and an acceleration IO device are both located on the same physical CPU, wherein allocating the at least two physical resources comprises allocating the physical processor, the acceleration IO device, and at least one of the physical memory or the physical IO device to the virtual machine, and
wherein allocating the at least two physical resources to the virtual machine is such that three or more physical resources allocated to the virtual machine are located on the same physical CPU.

3. The method according to claim 1, wherein the resource allocation parameter further comprises a second satisfaction degree parameter, wherein the second satisfaction degree parameter instructs the server to allocate the at least two physical resources to the virtual machine according to all parameters in the scheduling parameter, and wherein the method further comprises:
allocating, by the server, the physical processor, the physical memory, and the physical IO device to the virtual machine such that all physical resources allocated to the virtual machine are located on the same physical CPU; and
allocating, by the server, a set of physical resources to a second virtual machine, wherein the set of physical resources includes at least a second physical processor, a second physical memory, and a second physical IO device, and wherein the second physical processor, the second physical memory, and the second physical IO device are each located on a single physical CPU selected from the plurality of physical CPUs, the single physical CPU being different than the same physical CPU.

4. The method according to claim 1, wherein the resource allocation parameter further comprises a priority parameter indicating a parameter in the scheduling parameter and has a highest priority, and wherein allocating the at least two physical resources to the virtual machine comprises allocating a first physical resource to the virtual machine according to the scheduling parameter and the priority parameter such that the first physical resource is allocated to the virtual machine before other physical resources are allocated to the virtual machine, the first physical resource having the highest priority.

5. The method according to claim 1, wherein the resource allocation parameter further comprises a deployment parameter, and wherein the deployment parameter comprises at least one of the following parameters:
an isolation parameter indicating whether a same hyperthread on a same physical core is shared between the physical processor allocated to the virtual machine and a second physical processor allocated to a virtual machine hypervisor, wherein the same hyperthread is allocated to the virtual machine, and wherein the second physical processor is located on a second physical CPU selected from the plurality of physical CPUs;
a sharing parameter indicating whether the physical processor allocated to the virtual machine and another physical processor allocated to another virtual machine share the same hyperthread on the same physical core;
a hyperthread enabling parameter indicating whether a plurality of hyperthreads on the same physical core are all enabled; or
a hyperthread allocation parameter indicating whether the plurality of hyperthreads on the same physical core are allowed to be allocated to different virtual machines.

6. The method according to claim 1, wherein before allocating the at least two physical resources to the virtual machine, the method further comprises:
mapping, by the server, the physical processor, the physical memory, and the physical IO device to a virtual processor, a virtual memory, and a virtual IO device, respectively, wherein the virtual processor, the virtual memory, and the virtual IO device are located on the virtual machine; and
mapping, by the server, a set of physical resources to a set of virtual resources located on a second virtual machine, wherein each physical resource in the set of physical resources is located on a single physical CPU selected from the plurality of physical CPUs, wherein mapping the set of physical resources to the set of virtual resources is such that the server does not allocate physical resources from different physical CPUs to the second virtual machine.

7. The method according to claim 1, wherein before allocating the at least two physical resources to the virtual machine, the method further comprises acquiring topology information of the same physical CPU, wherein the topology information comprises:
a quantity of physical processors in the same physical CPU;
core information of a physical processor in the same physical CPU;
information about a size of a physical memory that can be allocated in the same physical CPU; and
IO device information of the same physical CPU,
wherein the core information comprises at least one type of the following information:
a quantity of physical cores;
a quantity of hyperthreads on a physical core; or
frequency of the physical core, and
wherein the IO device information comprises a quantity, a bandwidth, and a type of network adapter IO devices that can be allocated.

8. The method according to claim 1, wherein before allocating the at least two physical resources to the virtual machine, the method further comprises acquiring topology information of the same physical CPU, wherein the topology information comprises:
- a quantity of physical processors;
- core information of a physical processor in the same physical CPU;
- information about a size of a physical memory that can be allocated in the same physical CPU; and
- IO device information of the same physical CPU,
- wherein the core information comprises at least one type of the following information:
  - a quantity of physical cores;
  - a quantity of hyperthreads on a physical core; and
  - frequency of the physical core, and
- wherein the IO device information comprises a quantity, a bandwidth, and a type of memory IO devices that can be allocated.

9. The method according to claim 1, wherein before allocating the at least two physical resources to the virtual machine, the method further comprises acquiring topology information of the same physical CPU, wherein the topology information comprises:
- a quantity of physical processors;
- core information of a physical processor in the same physical CPU;
- information about a size of a physical memory that can be allocated in the same physical CPU; and
- IO device information of the same physical CPU,
- wherein the core information comprises at least one type of the following information:
  - a quantity of physical cores;
  - a quantity of hyperthreads on a physical core; and
  - frequency of the physical core, and
- wherein the IO device information comprises a quantity, a bandwidth, and type of acceleration IO devices that can be allocated.

10. A virtual machine resource allocation apparatus, comprising:
- a first physical processor;
- a first physical memory coupled to the first physical processor; and
- a first physical input/output (IO) device coupled to the first physical processor,
- wherein the first physical processor is configured to:
  - acquire a resource allocation parameter of a virtual machine using the first physical IO device, wherein the resource allocation parameter comprises a scheduling parameter indicating that at least two physical resources to be allocated to the virtual machine are located on a same physical central processing unit (CPU), wherein the scheduling parameter comprises at least a scheduling memory parameter and a scheduling IO device parameter, wherein the scheduling memory parameter indicates that the second physical processor and the second physical memory are both located on the same physical CPU, wherein the scheduling IO device parameter indicates that the second physical processor and the second physical IO device are both located on the same physical CPU, and wherein the same physical CPU comprises a plurality of physical resources including at least a second physical processor, a second physical memory, and a second physical IO device;
  - allocate the at least two physical resources to the virtual machine according to the resource allocation parameter such that two or more physical resources that are located on the same physical CPU are allocated to the virtual machine, wherein the resource allocation parameter further comprises a satisfaction degree parameter, wherein the satisfaction degree parameter instructs to allocate the at least two physical resources to the virtual machine according to some parameters in the scheduling parameter; and
  - allocate two of the second physical processor, the second physical memory, and the second physical IO device to the virtual machine from the same physical CPU when the satisfaction degree parameter instructs to allocate the physical resource according to some of the parameters in the scheduling parameter.

11. The apparatus according to claim 10, wherein the scheduling IO device parameter comprises at least one of the following three parameters:
- a scheduling network adapter IO device parameter indicating that the second physical processor and a network adapter IO device are both located on the same physical CPU, wherein allocating the at least two physical resources comprises allocating the physical processor, the network adapter IO device, and at least one of the physical memory or the physical IO device to the virtual machine;
- a scheduling memory IO device parameter indicating that the second physical processor and a memory IO device are both located on the same physical CPU, wherein allocating the at least two physical resources comprises allocating the physical processor, the memory IO device, and at least one of the physical memory or the physical IO device to the virtual machine; or
- a scheduling acceleration IO device parameter indicating that the second physical processor and an acceleration IO device are both located on the same physical CPU, and wherein allocating the at least two physical resources comprises allocating the physical processor, the acceleration IO device, and at least one of the physical memory or the physical IO device to the virtual machine,
- wherein allocating the at least two physical resources to the virtual machine is such that the first physical processor allocates three or more physical resources to the virtual machine that are located on the same physical CPU.

12. The apparatus according to claim 10, wherein the resource allocation parameter further comprises a second satisfaction degree parameter, wherein the second satisfaction degree parameter instructs the virtual machine resource allocation apparatus to allocate the physical resource to the virtual machine according to all parameters in the scheduling parameter, and wherein the first physical processor is further configured to allocate the second physical processor, the second physical memory, and the second physical IO device to the virtual machine such that all physical resources allocated to the virtual machine are located on the same physical CPU.

13. The apparatus according to claim 10, wherein the resource allocation parameter further comprises a priority parameter indicating a parameter in the scheduling parameter and has a highest priority, and wherein the first physical processor is further configured to allocate a first physical resource to the virtual machine according to the scheduling parameter and the priority parameter such that the first physical resource is allocated to the virtual machine before other physical resources are allocated to the virtual machine, the first physical resource having the highest priority.

14. The apparatus according to claim 10, wherein the resource allocation parameter further comprises a priority parameter indicating a parameter in the scheduling parameter and has a lowest priority, and wherein the first physical processor is further configured to allocate a first physical resource to the virtual machine according to the scheduling parameter and the priority parameter such that the first physical resource is allocated to the virtual machine after all other physical resources are allocated to the virtual machine, the first physical resource having the lowest priority.

15. The apparatus according to claim 10, wherein the resource allocation parameter further comprises a deployment parameter, and wherein the deployment parameter comprises at least one of the following parameters:
   an isolation parameter indicating whether a same hyperthread on a same physical core is shared between the physical processor allocated to the virtual machine and a second physical processor allocated to a virtual machine hypervisor, wherein the same hyperthread is allocated to the virtual machine, and wherein the second physical processor is located on a different physical CPU than the same physical CPU;
   a sharing parameter indicating whether the physical processor allocated to the virtual machine and another physical processor allocated to another virtual machine share the same hyperthread on the same physical core;
   a hyperthread enabling parameter indicating whether a plurality of hyperthreads on the same physical core are all enabled; or
   a hyperthread allocation parameter indicating whether the plurality of hyperthreads on the same physical core are allowed to be separately allocated to different virtual machines.

16. The apparatus according to claim 10, wherein the first physical processor is further configured to:
   acquire topology information of the same physical CPU;
   store the topology information in the first physical memory;
   select the same physical CPU and a set of physical resources, according to the topology information of the same physical CPU and the resource allocation parameter of the virtual machine, the same physical CPU being selected from a plurality of physical CPUs; and
   allocate the selected set of physical resources to the virtual machine, wherein the set of physical resources only includes physical resources located on the same physical CPU.

* * * * *